United States Patent [19]

Salisbury et al.

[11] Patent Number: 4,959,791
[45] Date of Patent: Sep. 25, 1990

[54] CONTROL SYSTEM FOR ENHANCING GRAY TONES OF A DIGITALLY OPERATED PRINTER

[75] Inventors: Richard S. Salisbury, Saffron Walden; Michael R. Prees, Rampton, both of England

[73] Assignee: Amansol Enterprises No. 17 Ltd., Gibralter

[21] Appl. No.: 157,961

[22] Filed: Feb. 19, 1988

[30] Foreign Application Priority Data

Feb. 20, 1987 [GB] United Kingdom ................. 8704051

[51] Int. Cl.$^5$ .............................................. G09G 1/14
[52] U.S. Cl. ..................................... 364/519; 355/239
[58] Field of Search ....................... 364/519, 518, 520; 340/700; 400/582, 583.1–583.4, 584; 355/202, 206, 239; 358/452, 456, 457–461

[56] References Cited

U.S. PATENT DOCUMENTS

| | | | |
|---|---|---|---|
| 4,580,134 | 4/1986 | Campbell et al. | 340/798 X |
| 4,591,969 | 5/1986 | Bloom et al. | 364/519 X |
| 4,646,078 | 2/1987 | Knierim et al. | 340/747 X |
| 4,694,405 | 9/1987 | Bradbury et al. | 364/518 |
| 4,745,560 | 5/1988 | Decker et al. | 364/519 |
| 4,780,768 | 10/1988 | Tomohisa et al. | 358/456 X |

*Primary Examiner*—Gary V. Harkcom
*Assistant Examiner*—H. R. Herndon
*Attorney, Agent, or Firm*—Fisher, Christen & Sabol

[57] ABSTRACT

A digitally operated printer, particularly a laser printer, has a control system which controls supply of operational signals to the printer from a signal source. The control system incorporates a converter which converts groups of input signals into larger groups of operational signals. The operational signals are generated in correspondence with coded information carried by the input signals, e.g. by reference to a store of predetermined operational signals. The larger groups of signals are fed at a faster rate than the input signals, so that the effect is to enhance the grey tones produced by the printer.

11 Claims, 1 Drawing Sheet

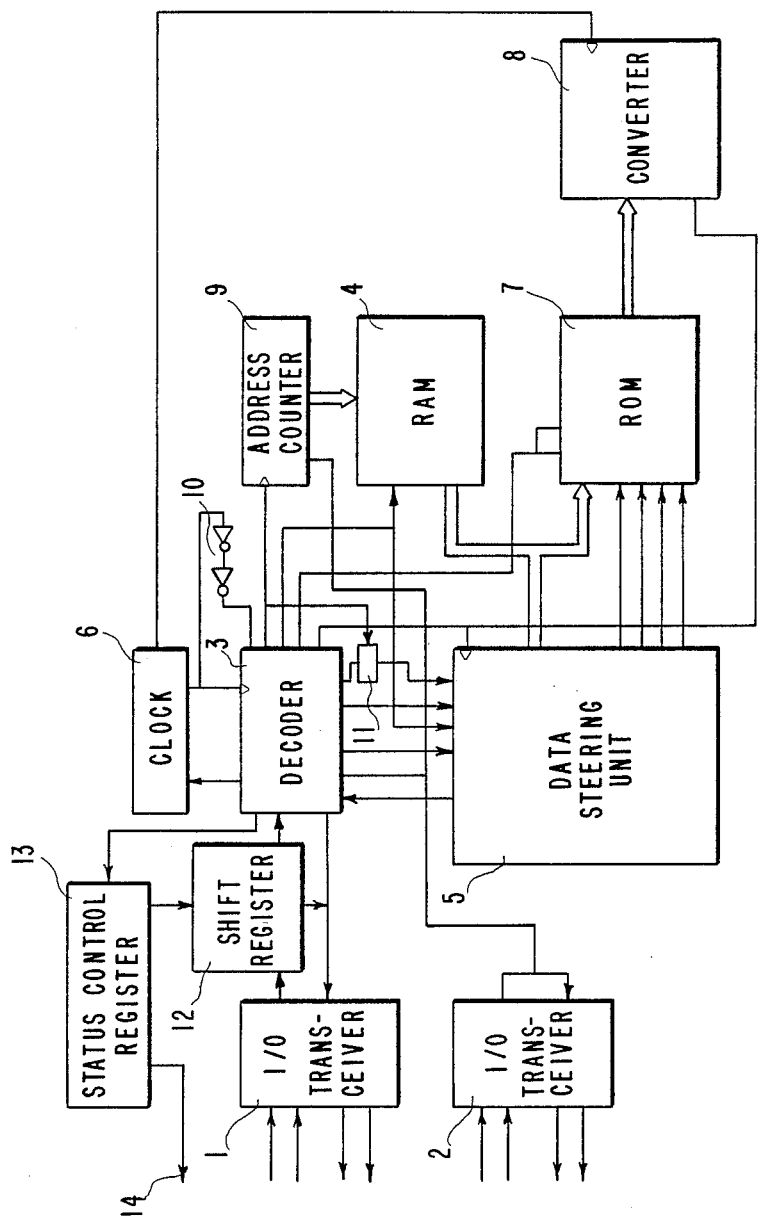

CONTROL SYSTEM FOR ENHANCING GRAY TONES OF A DIGITALLY OPERATED PRINTER

This invention relates to a control system for controlling supply of operational digital data signals to a digitally operated printer, such as a laser printer.

A conventional laser printer has a photosensitised drum which is scanned along successive lines with a finely focused beam of infrared radiation. The beam is pulsed in correspondence with digital data signals received e.g. from a computer so as to give a pattern of electrically charged spots on the drum, and a corresponding image made up of ink dots (of equal size and intensity) is formed on a sheet of plain paper by attracting particles of toner to the charged drum and then fusing these particles onto the paper.

Typical resolution of such a laster printing system is 300 dots per inch (118 dots per cm) with scanning at 300 lines per inch (118 lines per cm). With this resolution, a matrix of 9 dots (3 dots on each of 3 lines) can be allocated to each picture element (pixel) of the printed image thereby giving an effective image resolution of 100 dots/inch (39 dots/cm) with 10 possible grey tones for each image element (i.e. any number of dots from 0 to 9 can be inked for each picture element). This image resolution can be acceptable and indeed is much better than typical newsprint, but the relatively small number of grey tones results in an image of poor tonal quality. Tonal quality can be improved by increasing the allocation of dots to each picture element but this correspondingly reduces the image resolution.

An object of the present invention is to provide a control system for a digitally operated printer with which it is possible to achieve good tonal quality whilst at the same time maintaining good image resolution.

According to the invention therefore there is provided a control system for controlling supply of operational digital data signals to a digitally operated printer comprising an input device arranged to supply a stream of input digital data signals representative of tonal characteristics of an image to be printed, and an output device connected to said input device and arranged to produce said operational data signals corresponding to said input signals, characterised in that said input and output devices are interconnected by a conversion device which is arranged to identify patterns of predetermined groups of said input data signals and to produce therefrom groups of said output operational signals, each such output group having a pattern determined by the pattern of the corresponding input group and comprising a greater number of signals supplied at a greater rate than in the case with the corresponding input group.

With this arrangement insofar as the resolution of the printed image is determined by the size of the input group yet the output group which operates the printer contains an enchanced number of signals, it will be understood that it is possible to achieve high tonal quality without sacrificing good resolution. Thus, by way of example, where the identified input group consists of 9 binary data signals (i.e. corresponding to three lines of three dots), this gives a possibility of 64 tone pattern codes (using 6signals for tone pattern identification and the other 3 signals for control purposes). Whilst it is preferred to use a group of 9 input data signals the invention is not restricted to this feature and groups of 2×4, 4×4 or 5×5 or other arrangements may be used.

Conversion of the identified input pattern to the enhanced output pattern is preferably effected by reference to a range of predetermined stored output patterns. That is, the arrangement may be such that an input pattern is identified and this is used to activate production of a corresponding stored output pattern. In addition to any memory for storing such output patterns (which may be ROM storage) the conversion device will preferably include memory for storing input patterns (which may be RAM storage) while conversion is effected.

Insofar as the control system of the invention simply effects conversion of 'ordinary' data signals to 'enhanced' data signals of similar format it will be appreciated that the control system can be conveniently incorporated, with minimal modification, in an existing printing system.

Preferably the said input and output groups have the same temporal characteristics so that for a particular printing rate of the printer the overall size and location of the picture element printed under the control of the enhanced output pattern would be identical with that which would be printed under the control of the unenhanced input pattern. In this way, advantageously, the control system of the invention can be incorporated in a printing system without unduly disturbing printing functions which do not need enhancement (such as text printing). Matching of the temporal characteristics can be achieved by utilisation for control purposes of selected signals of the identified input group, and a phase locking technique may be employed.

With regard to the degree of enhancement, preferably the signal duration of the enhanced signals is less than the printer spot resolution so that the effect of the enhancement is to modulate the intensity of printed dots rather than increasing the number of printed dots per image element, although a small size of dots may also be feasible.

The invention will now be described further by way of example only and with reference to the accompanying drawing which is a block circuit diagram of one form of a control system according to the invention.

The control system is for use in controlling operation of a conventional laser printer from an image source such as a video camera or video recorder or computer or word processor or other device.

The output of the image source is processed (digitised) as necessary to produce a stream of binary data signals corresponding to successive points along successive scanned lines of an image. The data signals convey tonal information in coded form. There are also re-set signals which herald the start of new lines of data. The data and re-set signals are fed respectively to input/output transceivers 1 and 2 which act respectively as a data bit stream buffer and a line start pulse interface. These devices 1 and 2 are connected to a decoder 3. The decoder 3 identifies a 3×3 group of input data signals i.e. three data signals (a triplet) in the corresponding position on each of three successive scanned lines. This identification is effected for successive groups over the entire scanned field. Each identified group is interpreted in terms of a 64 level tone code (six binary bits out of the nine signals of the group) together with three control signals (the other three binary bits of the nine signals of the group) which are used for code checking and to assist with decoding the data and for phase locking purposes as mentioned hereinafter.

The identified tone code is fed to a read/write memory (static RAM) 4 via a data steering unit 5. This unit 5 is responsible for noting the lines to which the triplets belong and for allocating storage space in the memory 4 in an orderly fashion. The decoder 3 also generates control signals for the other parts of the circuit, in particular a control signal check for a clock signal oscillator 6. Code data is read from the RAM 4 and is translated by reference to a table of predetermined enhanced grey tone data patterns contained in a read only memory 7 (predetermined by experimentation). The translated enhanced data patterns are fed back to the decoder 3 as a stream of serial data which is phase locked at a data bit rate which is a predetermined multiple of the original input data (say five times) using a converter 8 (shift register) which is connected to the clock 6.

The decoder 3 arbitrates between original input data and produced enhanced data, and the produced enhanced data is fed via the input/output transceiver devices 1, 2 to the printer. Data accepted by the system as a whole is sent to the printer after a delay of exactly two lines to allow proper assembly of individual codes. Unit 9 (address counter) is used to count pixels along the picture line in order to assist with data storage. Units 10 and 11 serve to provide various detailed signal timing modification as required by other elements of the circuit.

A typical 3×3 coded input signal group and the resulting enhanced signal group (on three lines) would be as follows:

|  | INPUT | ENHANCED |
| --- | --- | --- |
| line 1 | 1 0 1 | 000101011101000 |
| line 2 | 0 1 0 | 000011111111000 |

The data stream of the enhanced signal group has a bit rate 15 times that of the input signal group, which means that the unit time for which the laser may be turned on or off is less than the equivalent spot resolution of the focused beam. In this way the effective intensity of the beam may be modulated as well as being able to work with a smaller minimum dot size. However, the time duration of each of the three lines of enhanced data is the same as that for the three lines of input data whereby the resulting printed picture element is of the same size and in the same position on the paper as would be the case using the input data without enhancement.

Considering the operation of the above described circuit in more detail: 15. One bit of each triplet is designated as a control bit, thus after decoding, the data exists as bit pairs. As each triplet is detected, the line position counter 9 increments and the data pair is written to one pair of the four possible in the (2K by 8) read/write memory chip U2, under control of the data steering chip 5. Imagine that the first triplet of line one has just arrived. This would be allocated to bits 6 and 7 of address 1 in the memory chip. The first triplet of line 2 would be allocated to bits 4 and 5 of address 1. The first triplet of line 3 would be allocated to bits 2 and 3 of address 1, at the same time sending all six bits of address 1 to the read-only memory 7 an address to look up the required modified data for printing line 1. The beginning of the next line of input data would represent line 1 for the pixel (picture element) immediately below the one that has just been assembled into address 1. This first data pair would be stored in bits 0 and 1 of address 1, which are so far unused, meanwhile using bits 2 to 7 to send to device 7 to obtain the second line of modified data for output. When the first triplet of the next line of input data is received, it will be stored in one of the previously used bit pairs, after bits 2 to 7 have been sent to the read-only memory for the third time to obtain the final pattern for the first pixel. Line numbering information is sent to the read-only memory from the data steering chip 5. In this way, three triplets are decoded and the resulting data pairs assembled into one memory location for subsequent translation and printing two lines later without changing the spatial organisation of the data.

The example described above comprises one circuit board assembly which may be fitted inside a CANNON or HEWLETT PACKARD laser printer without modification of its internal circuitry, and intercepts the data stream intended for the laser module, modifying it to a more detailed data stream in order to achieve the desired number of grey tones.

By encoding groups of none dots to form one picture element (pixel) and constraining the modified data to occupy the same time as the original coded data, this allows a one-to-one correspondence between the code and the picture in spatial terms, so that by appropriate software programming, normal text may be added to the page above, below and to the side of the designated picture area using the standard facilities of the existing printer software and firmware. In addition, it becomes a simple matter for printing normal text when pictures are not required, as the additional circuitry can be made 'transparent' as regards uncoded data.

To provide for transparency of operation in the absence of encoded picture data, a data shift register 12 is incorporated at the data input together with additional status control registers 13. The data stream for any print line has to pass through this register 12, which is normally arranged in the configuration of a shift register. At the beginning of any line of data, as soon as this register 12 has been filled with new data, rt is switched to a comparator configuration by the status control registers 13. If the pattern then present therein matches a predetermined condition (the 'turn-on code'), then the control registers 13 return the register 12 to the shift mode and prepare it for re-loading from the continuing input bit stream, otherwise control goes to a fixed 'uncoded text' mode wherein the data pattern held (and all subsequent data for that line) is simply delivered to the output unmodified save for a delay equivalent to the number of printer 'dots' held in the register 12 at any one time. The effect the device has on uncoded data is thus to shift data across the printed page by the number of dots held in this register 12. By careful choice of turn-on code, the complete device is thus prevented from disturbing the appearance of the printed page for print procedures that do not wish to take advantage of the enhancement provision without the need to actively disengage the circuitry.

Having accepted a turn-on code, the control circuitry arbitrates between 'picture' and 'text' in the following manner. When the register 12 has been filled for the second time, the control register circuits 13 switch it to a counter mode, wherein the decoding circuits are held inactive pending counting to a predetermined value, at which time the circuits are prepared for decoding of picture data. End of picture data is determined from analysis of the triplets with particular reference to any control bits which may be part of the particular code in use.

At termination of picture data, the control circuitry 13 is again able to prepare the register 12 to shift in another count value. The count values represent time delays and therefore a distance along the printed line for which the picture decoding circuitry is held inactive (i.e. the control system is 'transparent'). These inactive periods are defined in order to allow text and line graphic data to be printed alongside pictures without the one affecting the other. The segregation of picture data from other data also permits other controls to be more frequently introduced e.g. synchronisation of incoming data bits with the device internal clocking circuitry, and determination of reduced drum speed on the printer via a drum motor control output 14 of the status control registers 13 to allow increased line resolution for coding patterns other than the 3×3 herein described.

It is of course to be understood that the invention is not intended to be restricted to the details of the above embodiments which are described by way of example only.

We claim:

1. A control system for enchancing an image signal in a digitally operated printing system of the kind having a printer mechanism operated by operational digital data signals for printing matrices of dots defining pictures elements, wherein each matrix has a gray tone determined by the pattern of dots in the respective matrix, and image signal generating means for generating such operational digital data signals representative of tonal characteristics of an image to be printed, wherein said control system is connected between the image signal generating means and the printer mechanism to modify the data signals produced by the image signal generating means and to supply modified data signals to the printer mechanism to cause the printer mechanism to print enchanced matrices defining picture elements having enchanced gray tones, said control system comprising an input device to supply a stream to input operational digital data signals from said image signal generating means, and an output device connected to said input device to produce modified operational digital data signals, said input and output devices being interconnected by a conversion device to identify patterns of predetermined input groups of said input operational digital data signals and to produce therefrom output groups of said modified operational digital data signals corresponding to said enhanced matrices, each such output group having a patter predetermined by the pattern of the corresponding input group and comprising a greater number of digital data signals supplied at a greater rate relative to the corresponding input group.

2. A control system according to claim 11, wherein conversion of the identified input group pattern to the output group pattern is effected by reference to a range of predetermined output group patterns stored in a memory device.

3. A control system according to claim 11, wherein the said input and output groups have the same temporal characteristics.

4. A control system according to claim 3, wherein the temporal characteristics of the input and output groups are matched by identification of selected signals of the identified input group.

5. A control system according to claim 11, wherein each identified group consists of nine signals made up of three signals on each of three successive rows and six of the nine signals are used as a 6-bit code for interpretation as one of 64 predetermined said output groups.

6. A control system according to claim 11, wherein a code identification device is provided which operates to identify start codes at predetermined start positions in said stream of input digital data signals, said device being operable to divert said input data signals to said output device without modification by said conversion device if said identification device fails to identify a predetermined turn-on start code.

7. A control system according to claim 6, wherein said identification device also operates to identify end codes and in response thereto terminate modification of said input signals by said conversion device.

8. A control system according to claim 7, wherein said identification device operates to introduce a delay before a period of modification of said input signals by said conversion device.

9. A control system according to claim 11 further including a digitally operated printer operatively connected to said control system.

10. A control system according to claim 9 wherein said printer is a laser printing system.

11. A printer system comprising an image signal generating means generating first operational digital data signals defining pixels corresponding to a predetermined image to be printed, wherein said image is defined by matrices of a predetermined number and pattern of printed dots; a conversion means to receive and identify said first digital operational data signals corresponding to said predetermined image to be printed, and to produce enchanced output digital operational data signals for producing an image corresponding to said predetermined image to be printed, wherein said enhanced output digital data signals include a greater number of signals and said signals are produced at a greater rate relative to said first operational digital data signals, whereby the intensity of dots printed in response to said enhanced signals is greater relative to the intensity of dots printed in response to said first signals; printing means to receive said enhanced operational digital data signals corresponding to matrices of a predetermined number and pattern of dots to be printed, said printing means printing matrices of dots in response to said enhanced operational digital data signals.

* * * * *